United States Patent [19]

Avedissian

[11] 4,138,210

[45] Feb. 6, 1979

[54] CONTROLLING THE PRESSURE OF A GAS GENERATOR

[75] Inventor: Michael K. Avedissian, Mohnton, Pa.

[73] Assignee: Western Electric Company, Inc., New York, N.Y.

[21] Appl. No.: 837,332

[22] Filed: Sep. 27, 1977

[51] Int. Cl.² .......................................... F23H 1/00
[52] U.S. Cl. .................................... 431/12; 431/19; 431/75; 422/242
[58] Field of Search ...................... 431/2, 3, 12, 16, 19, 431/61, 75, 89; 23/281, 282

[56] References Cited

U.S. PATENT DOCUMENTS

| 558,176 | 4/1996 | Huber | 431/2 |
|---|---|---|---|
| 1,352,364 | 9/1920 | Graziano | 219/379 |
| 2,049,283 | 7/1936 | Weckerly | 250/231 R |
| 2,109,874 | 3/1938 | Young et al. | 219/19 |
| 2,365,601 | 12/1944 | Sipman | 177/311 |
| 3,586,468 | 6/1971 | Sims et al. | 431/75 X |
| 3,857,077 | 12/1974 | Kasmer | 318/257 |
| 3,897,195 | 7/1975 | Finch | 431/19 |
| 3,900,763 | 8/1975 | Turner | 315/156 |
| 3,909,187 | 9/1975 | Gregory | 431/268 |
| 4,081,656 | 3/1978 | Brown | 431/2 X |

OTHER PUBLICATIONS

Avedissian:, "Water Welder", Western Electric Technical Digest, vol. 32, Oct. 1973, pp. 5-6.

Primary Examiner—Edward G. Favors
Attorney, Agent, or Firm—Robert Y. Peters

[57] ABSTRACT

In using a gas torch it is often necessary to maintain a uniform flame. This can be accomplished by maintaining a constant pressure at the torch tip. A pressure transducer is placed at the output of a generator that produces gas by electrolysis for the torch. The transducer indicates changes in the gas pressure by changing resistance. The transducer is coupled to a resistance-capacitance circuit and forms a variable part of the resistance of the circuit. This circuit, in turn, is coupled to the firing gate of a triac which controls the rate of gas disassociation of the electrolytic solution in the gas generator by varying the amount of current fed to the gas generator. When the pressure at the output of the generator varies, the resistance of the pressure transducer changes thereby changing the RC time constant of the resistance-capacitance circuit. Such a change modifies the firing rate of the triac and, therefore, the rate of gas generation and pressure.

9 Claims, 1 Drawing Figure

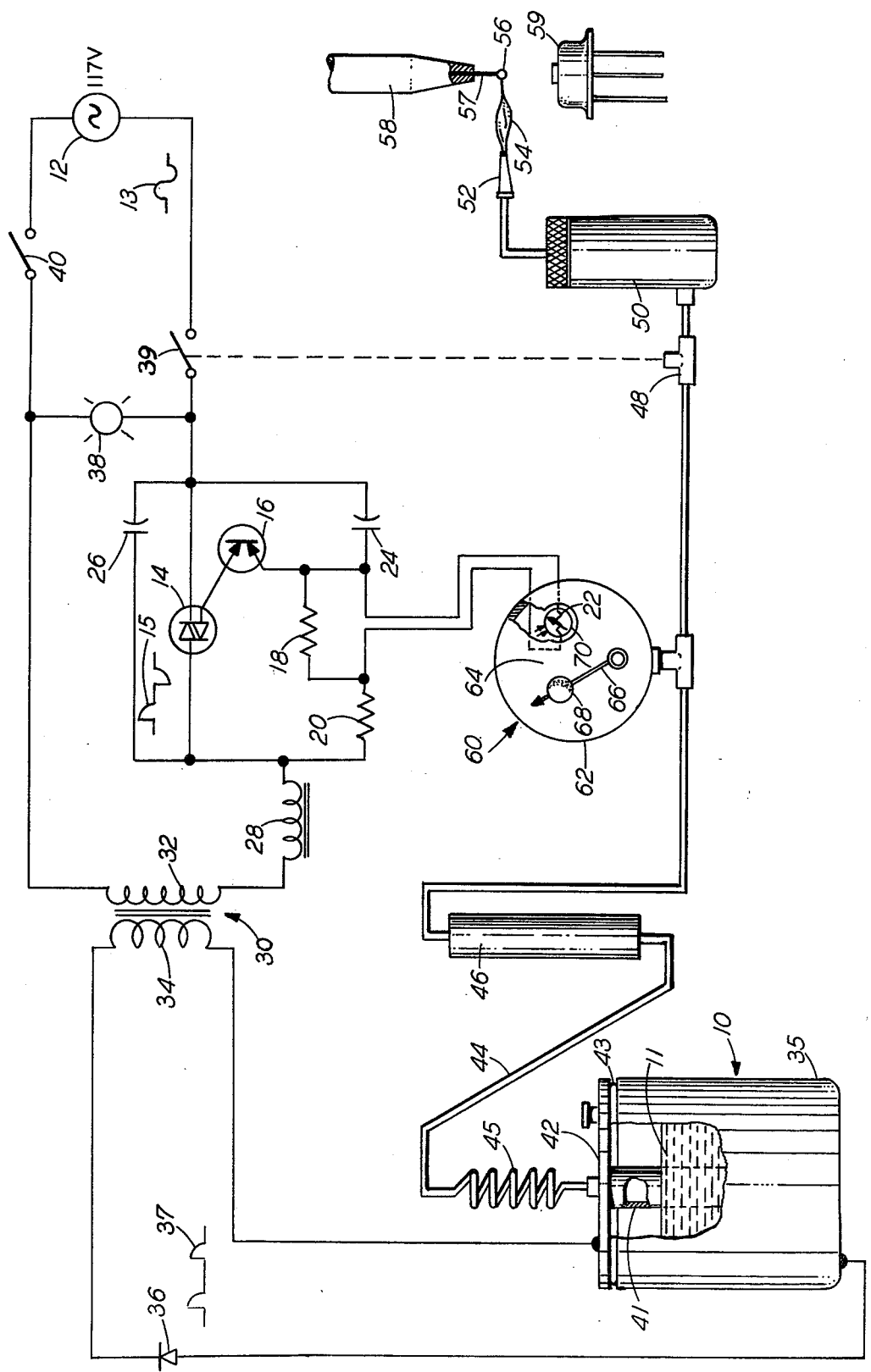

CONTROLLING THE PRESSURE OF A GAS GENERATOR

BACKGROUND OF THE INVENTION

1. Field of the Invention

This invention relates generally to methods of and apparatus for controlling gas pressure, and, more particularly, to methods of and apparatus for controlling a gas flame at a torch tip by controlling the pressure at the tip.

2. Description of the Prior Art

In many manufacturing operations a small flame at a torch tip is used for a variety of different purposes, such as cutting. The gas for the torch is often fueled by a gas generated by disassociation of an electrolytic solution. One example of this type of torch is manufactured by Henes Manufacturing Co. under the registered trademark "Water Welder." This device uses water as the electrolytic solution and generates hydrogen and oxygen gases by disassociation of the water when an electrical current is supplied to the generator. The application of the current is controlled by a triac circuit.

In manufacturing semiconductor devices gas torches are frequently used. For example, in the manufacture of devices such as diodes, transistors, and light-emitting diodes, a gas torch is used to form a ball at the severed end of a wire. This ball is then bonded to a portion of the device.

In the past maintenance of a uniform flame for these gas torches has been a problem. Frequently, the operations in question require changing the torch tips with some regularlity, and this can greatly affect the gas pressure at the torch tip. Since these pressure changes can result in an unsatisfactory flame, an operator must completely readjust the voltage control circuit to again obtain a proper flame. Also, impurities in the electrolyic often make it difficult to maintain a uniform flame. Changes in the electrolyte level and temperature can also cause variations in the rate of disassociation and thereby affect the flame uniformity.

Past attempts at maintaining a uniform flame have been limited to providing an operator to manually adjust the firing of a triac firing circuit. This has proven both time consuming and wasteful since much of the product is often ruined during the adjustment period.

SUMMARY OF THE INVENTION

It is, therefore, an object of the present invention to provide new and improved methods of and apparatus for controlling the pressure of a gas generator.

Another object of the present invention is to provide new and improved methods of the apparatus for maintaining a uniform gas flame at a gas torch tip by controlling the pressure at the tip.

With these and other objects in view, the present invention contemplates new methods of generating a gas by disassociation of an electrolytic solution and sensing the pressure of the gas with a pressure transducer which will produce a signal in response to pressure changes. The signal from the pressure transducer controls an electrical characteristic of a circuit which controls the operation of a switching element. The switching element, in turn, controls the rate of gas disassociation of the electrolytic solution, thereby controlling the pressure of the gas.

The invention further contemplates an apparatus for controlling the pressure of a gas which is generated by disassociation of an electrolytic solution. A pressure transducer is located at the output of the gas generator to provide a signal which is responsive to changes in the gas pressure. These transducer signals control an electrical characteristic of a control circuit. A switching element varies the rate of gas disassociation of the electrolytic solution in response to changes in the electrical characteristic of the control circuit. These variations of the rate of gas disassociation control the gas pressure.

BRIEF DESCRIPTION OF THE DRAWING

Other objects and advantages of the present invention may be more clearly understood by reference to the following detailed description and drawing wherein:

The sole FIGURE is a partial block diagram and partial schematic diagram of the apparatus for controlling a gas flame in accordance with the present invention.

DETAILED DESCRIPTION

Referring now to the drawing, a generator, designated generally by 10, is shown for generating a gas when an electrical current is applied to an electrolytic solution 11 contained within the gas generator 10. The current to the electrolytic solution 11 forms the gas by disassociation of the electrolytic solution. This type of disassociation will occur with a variety of electrolytic solutions. An example of the electrolytic solution 11 is water which disassociates to form hydrogen gases and oxygen. Since the hydrogen gas is flammable, it can be ignited to form a flame, as will be described further herein.

Current is supplied to the system by an alternating current source 12 as shown by waveform 13. A triac 14, which is a bidirectional semiconductor switching element, is located between the alternating current source 12 and the gas generator 10. This triac 14 controls the amount of current allowed to pass to the gas generator 10 by only passing current when the triac 14 is gated into conduction. The output of triac 14 is shown as waveform 15 with a portion of each half cycle cut-off. The cut-off portion of each half cycle is the time which the triac 14 is turned off. Thus, varying the time at which the triac 14 is gated into conduction will control the amount of each half-cycle of current which passes to the gas generator 10.

Control of the firing of the triac is obtained by a circuit comprising a diac 16 with its input coupled to fixed resistors 18 and 20, variable resistor 22, and capacitor 24. The RC time constant of the resistors 18, 20 and 22 and capacitors 24 determines the time required for the voltage across the capacitor 24 to reach the breakover voltage of the diac 16. When the diac 16 breaks down, the voltage across the capacitor 24 will discharge through the triac 14 gating it into conduction. The sooner the triac 14 is gated on, the more current it will pass to the gas generator 10.

Increasing the variable resistance 22 causes an increased RC time constant. This delays the breakdown of the diac 16 thereby delaying the firing of the triac 14. Such a delay causes the triac to be turned off for a longer period of time thereby decreasing the flow of current to the gas generator 10.

A capacitor 26 is coupled in parallel with the triac 14, and an inductor 28 is coupled in series with the output of the triac 14 to form a filter that will reduce any interference the triac may have on other equipment. The inductor 28 in turn is coupled to the primary coil 32 of a transformer designated generally by the numeral 30.

The secondary coil 34 of the transformer 30 is coupled to the body 35 of the gas generator 10 by a diode 36. This diode 36 passes a half cycle shown as waveform 37.

A pilot light 38 is coupled in parallel with the alternating current source 12 to indicate when the system is in operation. Safety switch 39 and on-off switch 40 are coupled directly to the alternating current source 12 to allow for connecting or disconnecting the alternating current source 12 from system.

Typically, the body 35 of the gas generator 10 is made of stainless steel. Thus, when current is applied to it from the diode 36, the body 35 will conduct the current to the electrolytic solution 11. An electrode tube 41, also typically made of stainless steel, extends from the electrolytic solution 11 in which it is immersed to the cover 42 of the gas generator 10. The cover 42, which is electrically isolated from the body 35 by electrical insulation 43, is coupled back to the secondary coil 34 thereby completing the circuit.

Gas generated in the gas generator 10 flows through an output conduit 44 to a separation coil 45. This separation coil 45 captures droplets of the electrolyt solution (i.e., water) and allows them to flow back into the gas generator 10. Capturing the electrolytic droplets in this manner helps to prevent contamination of the generated gas. Further prevention of contamination is obtained by passing the gas through a desiccant 46 which serves to further dry the generated gas.

To prevent a dangerous pressure buildup, a safety pressure sensor 48 is coupled between the output conduit 44 and the safety switch 39. This safety pressure sensor 48 will open the safety switch 39 when the pressure in the output conduit exceeds a predetermined level.

It is possible to increase the BTU content of the generated gas by passing it through a booster 50. Typically, this booster would be filled with an alcohol. Once the BTU content has been increased by the booster 50, the gas is passed to a torch tip 52 where it is lit to form a flame 54. As an example of the use of the flame 54, it is shown forming a ball 56 on the end of a wire 57 which is fed out of a needle 58. The needle 58 is then lowered to bond the ball 56 to a semiconductor device 59.

Fine control of the rate of gas disassociation and, hence, the gas flame 54 can be obtained by placing a pressure transducer designated generally by the numeral 60 in the output conduit 44. The pressure transducer 60 is coupled to the variable resistor 22 to provide a signal to vary the resistance of the variable resistor 22 with changes in the gas pressure in the output conduit 44. Alternatively, the pressure transducer 60 can itself be the variable resistance 22 which will form part of the RC time constant of resistors 18 and 20 and capacitor 24.

One type of possible pressure transducer 60 is shown as being a pressure gauge 62 having a dial 64, a pointer 66 with a vane 68. A photocell 70 is located in the face of the dial 64 to serve as the variable resistance 22 in this embodiment. As the pointer 66 moves with changes in the pressure, the vane 68 changes its position with respect to the photocell 70 Since the resistance of the photocell 70 increases when the light striking it decreases, it increases its resistance in proportion to the amount of light which the vane 68 prevents from reaching it.

In operation, the apparatus serves to decrease the rate of gas disassociation in the gas generator 10 when the pressure of the gas in the output conduit 44 exceeds a given predetermined level. Alternatively, it increases the rate of gas disassociation when the pressure falls below the predetermined level. This is accomplished by causing the pressure transducer 60 to change the resistance of the variable resistor 22 in response to variations in the pressure in the output conduit 44. These resistance changes alter the RC time constant of resistors 18, 20 and 22 and capacitor 24. For example, when the gas pressure in the output conduit 44 increases, the resistance increases thereby giving a greater RC time constant. This delays the breakdown point of the diac 16 and thereby the firing time of the triac 14. When the firing time of the triac 14 is delayed, less current from the alternating current source 12 passes to the gas generator 10. Since a small amount of current if flowing to the gas generator 10, the electrolytic solution disassociates at a slower rate thereby generating less gas.

Although the pressure transducer 60 has been shown as an arrangement of a pressure gauge 62 with a photocell 70, any pressure transducer capable of giving a signal indicative of the pressure change may be used. For example, strain gauges could be used. A particularly attractive type of strain gauge is that manufactured by Endevco, Inc. under the registered trademark "Pixie Transducer."

Similarly, although the water has been given as one possible electrolytic solution and hydrogen gas as a product thereof, the invention could operate with any electrolytic solution which gives off a gas by disassocation when current is passed through the solution.

The triac 14 has been shown as a preferred embodiment of the gating element since it allows for precise control of the current flow to the gas generator 10. However, other gating means could be used such as a silicon-controlled rectifier. In the alternative, a variac control can be used.

Furthermore, the exact arrangement of the resistors and capacitors forming the RC circuit for controlling the triac 14 is not critical. Any arrangement of resistors and capacitors which can be coupled to the pressure transducer 60 to increase its time constant with increases in the gas pressure will suffice. Also, it should be noted that the capacitance could be varied to bring about this increased RC time constant rather than the resistance.

It is to be understood that the above-described arrangements are simply illustrative of the application of the principles of this invention. Numerous other arrangements may be readily devised by those skilled in the art which embodies the principles of the invention and falls within its spirit and scope.

What is claimed is:

1. A method of controlling the pressure of a gas at an orifice comprising:
   generating the gas by disassociation of an electrolytic solution;
   supplying the gas to the orifice;
   sensing the pressure of the supplied gas with a pressure transducer to produce a signal in response to pressure changes;
   controlling an electrical characteristic of a circuit in response to said signal to control the operation of a switching element; and
   varying the rate of gas disassociation of the electrolytic solution in response to the operation of the switching element, thereby controlling the pressure of the gas at the orifice.

2. A method of controlling a gas flame at a torch tip by controlling the pressure of the gas at the tip comprising:
generating the gas by disassociation of an electrolytic solution;
supplying the gas to the torch tip;
sensing the pressure of the supplied gas with a pressure transducer which changes resistance in accordance with pressure changes;
controlling the time constant of a resistance-capacitance circuit in accordance with changes in the pressure transducer's resistance to control the operation of a bidirectional switching element; and
varying the rate of gas disassociation of the electrolytic solution in response to the switching element, thereby controlling the pressure of the gas at the torch tip.

3. The method of claim 2, wherein the switching element varies the rate of gas disassociation by controlling the amount of current flowing to the electrolytic solution.

4. The method of claim 2, wherein the electrolytic solution comprises water and the generated gas comprises hydrogen.

5. An apparatus for controlling the pressure of a gas at an orifice comprising:
a gas generator containing an electrolytic solution which forms gas by disassociation, said gas generator having an output coupled to the orifice;
a pressure transducer located at the output of the generator to provide a signal in response to changes in the gas pressure to control an electrical characteristic of a control circuit; and
a switching element coupled to the control circuit to vary the rate of gas disassociation of the electrolytic solution in accordance with changes in the electrical characteristics of said control circuit to thereby control the gas pressure at the orifice.

6. An apparatus for controlling a flame at a torch tip by controlling the pressure of a gas at the tip comprising:
a gas generator containing an electrolytic solution which forms gas by disassociation when a current is passed through the solution, said gas generator having an output coupled to the torch tip;
a pressure transducer coupled to the output of the gas generator, said pressure transducer changing its electrical resistance with changes in the gas pressure in the output;
a resistance-capacitance control circuit coupled to the pressure transducer, the time constant of said resistance-capacitance control circuit being responsive to changes in the resistance of the pressure transducer; and
a bidirectional switching element coupled to the resistance-capacitance control circuit and the gas generator to control the amount of current flowing to the gas generator in response to the time constant of the resistance-capacitance control circuit thereby controlling the rate of gas disassociation and the gas pressure at the torch tip.

7. The apparatus of claim 6, wherein the switching element is a triac with the gate of said triac being coupled to the resistance-capacitance circuit whereby the duration of time which the triac conducts is controlled by the time constant of the resistance-capacitance circuit.

8. The apparatus of claim 6, wherein the pressure transducer comprises:
a pressure gauge having a dial and a pointer; and
a photoelectric cell located in the dial of the pressure gauge, said photoelectric cell having a resistance which varies in accordance with the amount of light which the pointer blocks from entering the cell.

9. The apparatus of claim 6, wherein the electrolytic solution comprises water and the generated gas comprises hydrogen.

* * * * *